US007636856B2

(12) United States Patent
Gheorghescu et al.

(10) Patent No.: US 7,636,856 B2
(45) Date of Patent: Dec. 22, 2009

(54) PROACTIVE COMPUTER MALWARE PROTECTION THROUGH DYNAMIC TRANSLATION

(75) Inventors: Gheorghe Marius Gheorghescu, Redmond, WA (US); Adrian M Marinescu, Sammamish, WA (US); Adrian E Stepan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 11/005,000

(22) Filed: Dec. 6, 2004

(65) Prior Publication Data

US 2006/0123244 A1 Jun. 8, 2006

(51) Int. Cl.
*G06F 11/30* (2006.01)
*G06F 11/00* (2006.01)
(52) U.S. Cl. .......................... 713/188; 713/187; 726/24
(58) Field of Classification Search ............. 726/22–26; 714/25, 28, 29, 37–39, 48–56; 713/187–188, 713/193–194; 711/163–164
See application file for complete search history.

(56) References Cited

U.S. PATENT DOCUMENTS

| | | | | |
|---|---|---|---|---|
| 5,381,533 | A * | 1/1995 | Peleg et al. | 712/215 |
| 5,732,210 | A * | 3/1998 | Buzbee | 714/38 |
| 5,765,030 | A * | 6/1998 | Nachenberg et al. | 714/33 |
| 5,826,013 | A * | 10/1998 | Nachenberg | 726/22 |
| 5,951,698 | A * | 9/1999 | Chen et al. | 714/38 |
| 6,330,691 | B1 * | 12/2001 | Buzbee et al. | 714/35 |
| 6,357,008 | B1 * | 3/2002 | Nachenberg | 726/24 |
| 6,631,514 | B1 * | 10/2003 | Le | 717/137 |
| 6,704,925 | B1 * | 3/2004 | Bugnion | 717/138 |
| 2002/0091934 | A1 * | 7/2002 | Jordan | 713/188 |
| 2003/0041315 | A1 * | 2/2003 | Bates et al. | 717/129 |
| 2003/0101381 | A1 * | 5/2003 | Mateev et al. | 714/38 |
| 2005/0005153 | A1 * | 1/2005 | Das et al. | 713/200 |

OTHER PUBLICATIONS

Cifuentes, Cristina, "Reverse Compilation Techniques," Jul. 1994, Queensland University of Technology, pp. 3-15.*
International Search Report and Written Opinion dated Jul. 11, 2008 for PCT Application Serial No. PCT/US058/43773, 12 Pages.

* cited by examiner

*Primary Examiner*—Kimyen Vu
*Assistant Examiner*—Darren Schwartz
(74) *Attorney, Agent, or Firm*—Workman Nydegger

(57) ABSTRACT

The present invention includes a system and method for translating potential malware devices into safe program code. The potential malware is translated from any one of a number of different types of source languages, including, but not limited to, native CPU program code, platform independent .NET byte code, scripting program code, and the like. Then the translated program code is compiled into program code that may be understood and executed by the native CPU. Before and/or during execution, the present invention causes a scanner to search for potential malware stored in memory. If malware is not detected, the computing device causes the CPU to execute the translated program code. However, execution and/or analysis of potential malware may be interrupted if computer memory that stores potential malware is altered during execution. In this instance, the potential malware now stored in memory is translated into safe program code before being executed.

22 Claims, 6 Drawing Sheets

PROACTIVE COMPUTER MALWARE PROTECTION THROUGH DYNAMIC TRANSLATION

FIELD OF THE INVENTION

The present invention relates to computing devices and, more particularly, to protection of computing devices against malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

When a computing device is attacked or "infected" by computer malware, the adverse results are varied, including disabling system devices; erasing or corrupting firmware, applications, or data files; transmitting potentially sensitive data to another location on the network; shutting down the computing device; or causing the computing device to crash. Yet another pernicious aspect of many, though not all, computer malware is that an infected computing device is used to infect other systems.

A traditional defense against computer malware, and particularly computer viruses and worms, is antivirus software. Generally described, antivirus software scans incoming data, looking for identifiable patterns associated with known computer malware. Also, increasingly, antivirus software is utilizing heuristic techniques that compare incoming data with characteristics of known malware. In any event, upon detecting a computer malware, the antivirus software may respond by removing the computer malware from the infected data, quarantining the data, or deleting the infected incoming data. Unfortunately, antivirus software typically works with known, identifiable computer malware. Frequently, this is done by matching patterns within the data to what is referred to as a "signature" of the malware. One of the core deficiencies in this malware detection model is that an unknown computer malware may propagate unchecked in a network until antivirus software on a computing device is updated to identify and respond to the malware.

As antivirus software has become more sophisticated and efficient at recognizing thousands of known computer malware, so too have the computer malware become more sophisticated. For example, malicious computer users now encrypt malware to obscure the malware signature behind unrecognizable patterns. For example, a polymorphic malware consists of a malware decryption routine and an encrypted malware "payload." When, a user executes an infected program, the malware decryption routine gains control of the computing device, and decrypts the previously encrypted malware payload. Then the decryption routine transfers control of the computing device to the decrypted malware payload. Each time a new target is infected, the malware replicates both the decryption routine and the malware payload. Typically, the encryption key used to encrypt the malware payload is changed when the malware is replicated. As a result, the encrypted malware has no identifiable pattern or "signature" by which the malware may be recognized by antivirus software.

When oligomorphic malware was created, antivirus software developers recognized that the decryption routine remained constant between versions of the malware. The antivirus software developers exploited this weakness by scanning not just for malware signatures, but also for specific decryption routines known to be associated with malware. In response, malicious computer users developed more sophisticated malware designed to prevent the decryption routine from being identified (hereinafter all types of malware that use techniques designed to hide a malware signature will be referred to as "obscured malware").

FIG. 1 is a pictorial diagram illustrating one type of obscured malware known as polymorphic malware 100 that may be used to distribute a "payload." As illustrated in FIG. 1, the polymorphic malware 100 attaches to a host program 102 and, in this instance, is illustrated as a virus 104 that includes an encryption engine 106, a polymorphic file infector 108, and a decryption routine 110. The polymorphic malware 100 encrypts a segment of the virus 104 to prevent an identifiable signature from being identified. However, the virus 104 also includes an encryption engine 106 that generates randomized encryption routines each time virus 104 propagates. When the virus 104 is launched, the polymorphic file infector 108 identifies a new target and replicates the virus 104 in computer memory. At this point, the encryption engine 106 randomly generates a new encryption routine that has little or no similarity to previously developed encryption routines. Then an encrypted copy of the virus 104 is appended to the identified target. As a result, the virus 104 is encrypted and routines used for encryption and decryption vary between infections. Without a fixed malware signature or fixed encryption routine, conventional antivirus software is unable to detect the polymorphic malware 100 as a signature is not identifiable.

In light of the above-identified problems, it would be beneficial to computer users to have software that proactively protects a computer against malware such as obscured malware.

SUMMARY OF THE INVENTION

The present invention provides a security model for protecting a computing device against malware. In accordance with one aspect of the present invention, a method for translating potential malware associated with a computing device into safe program code is provided. This aspect of the present invention begins analyzing potential malware at an identified program entry point in memory. An initial analysis of the potential malware consists of dividing the program code into "basic blocks" by decoding instructions until the last instruction in the basic block is encountered. In instances when instructions in a basic block were not previously scanned, a scanner searches the basic block for malware. If a malware is detected and the identity of the malware is made with a sufficient level precision, the file that contains the malware is reported as being infected. In this instance, further analysis by the present invention is not necessary. In other instances, the decoded instructions in the basic block are translated into equivalent and safe program code that is executable. The translation may be performed directly from the potential malware. Alternatively the translation may be performed using an architecture neutral format that is "compiled" into executable program code.

In accordance with another aspect of the present invention, a method for safely executing basic blocks of translated program code is provided. This aspect of the present invention includes determining if a basic block of translated program code was altered after being translated. In instances when alterations occurred, the modified basic blocks are translated before being executed. When an alteration did not occur, additional translation is not necessary and the existing "compiled" program code is executed. The executable program code is able to determine if previously translated program code was altered as a result of execution. Any basic blocks of program code that were altered are discarded and translated again before being executed. After execution completes, the current execution point is updated, transferring control of execution to a successor basic block. Then translation and execution of basic blocks repeats until malware is identified, an interrupt condition occurs, or the program completes executing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In accordance with this invention, a system, method, and computer readable medium for translating potential malware associated with a computing device into safe program code are provided. Potential malware is translated from any one of a number of different types of source languages including, but not limited to, native CPU program code, platform independent .NET byte code, and scripting program code into safe and functionally equivalent program code that is in an architecture-neutral format. Then the translated program code is "compiled" back into program code that may be executed by the native CPU. Before and/or during execution, the present invention causes a scanner to search for malware stored in memory. If malware is not detected, the computing device causes the CPU to execute the translated program code. However, execution may be interrupted if computer memory that stores potential malware is altered during execution. In this instance, the new potential malware now stored in memory will be translated into safe program code before being executed.

Although the present invention will primarily be described in the context of specific computer architectures and source languages, those skilled in the relevant art and others will appreciate that the present invention is also applicable in other computer architectures or source languages than those described. The following description first provides an overview of a system in which the present invention may be implemented. Then methods that implement the present invention are described. The illustrative examples provided herein are not intended to be exhaustive or to limit the invention to the precise forms disclosed. Similarly, any steps described herein may be interchangeable with other steps, or combinations of steps, in order to achieve the same result.

Figure 2:
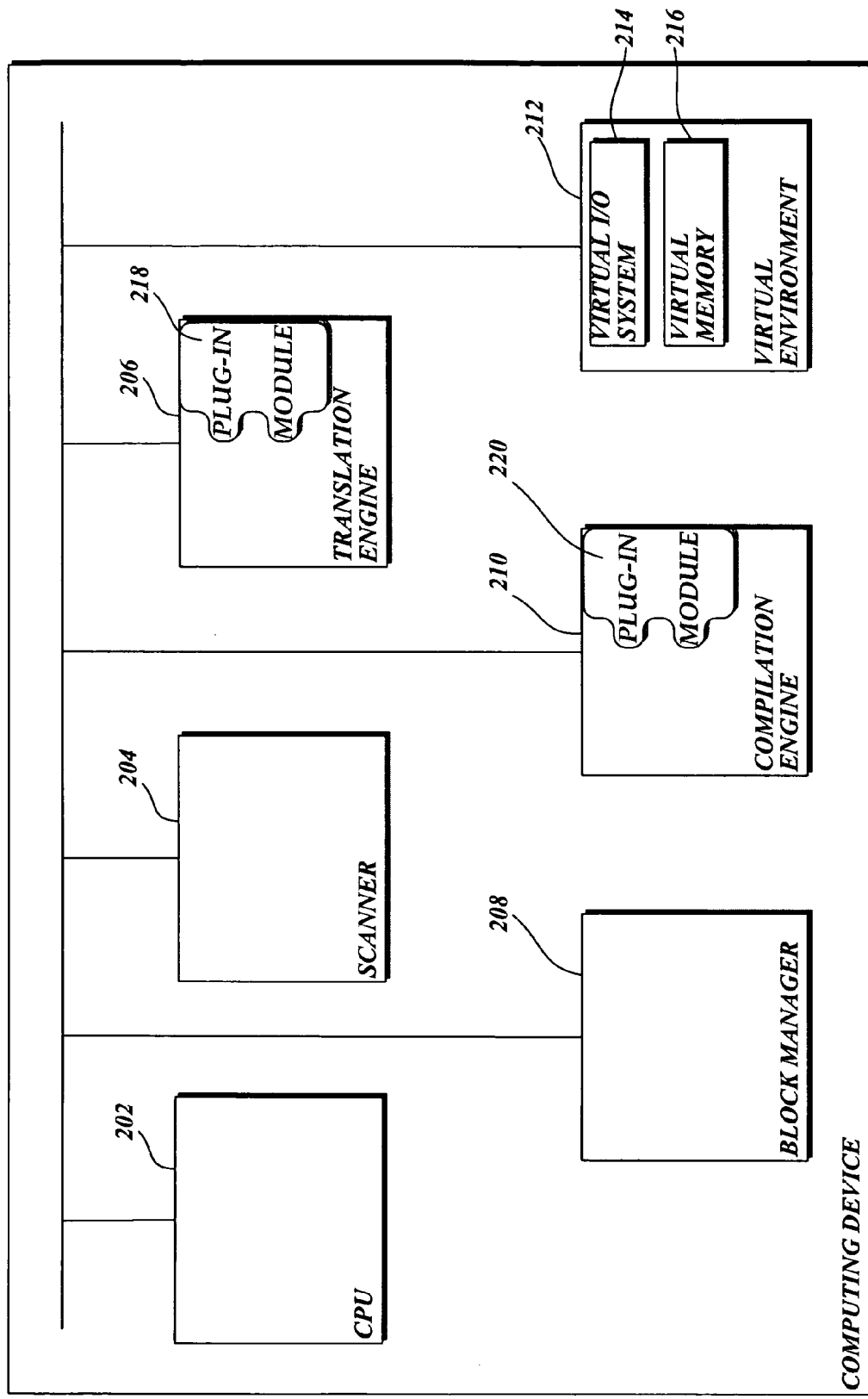
FIG. 2 is a block diagram of the components of a computing device suitable to perform dynamic translation and execute program code in accordance with the present invention.

Referring now to FIG. 2, the following is intended to provide an exemplary overview of one suitable malware detection system 200 in which the invention may be implemented. The illustrated malware detection system 200 includes a central processing unit 202, a scanner 204, a translation engine 206, a block manager 208, a compilation engine 210, and a virtual environment 212. In one embodiment of the present invention, the virtual environment 212 includes a virtual I/O system 214 and a virtual memory 216. Also, as described in further detail below, the translation engine 206 and the compilation engine 210 may each support one or more plug-in modules, such as plug-in modules 218 and 220. In general terms describing one embodiment of the present invention, components of the malware detection system 200 provide the infrastructure needed by the scanner 204 to detect obscured malware. Moreover, the components of the malware detection system 200 allow for the fast decryption and detection of malware while executing safe program code translated from the potential malware.

As illustrated in FIG. 2, the malware detection system 200 includes a CPU 202. Those skilled in the art and others will recognize that the CPU 202 serves as the computational center of the malware detection system 200 by supporting the execution of native program code. One prior art system used to detect obscured malware "emulates" program execution in a virtual operating environment that includes a virtual CPU. During emulation, a behavior signature is generated based on the observed events of the program in the virtual operating environment. The behavior signature is suitable for analysis to determine whether the emulated program is malware. In this type of system, each instruction in the program is emulated on a virtual CPU. As a result, emulation can be time-consuming and result in noticeable performance degradation when compared to the malware detection infrastructure provided by the present invention. For example, a program instruction in a loop is emulated on the virtual CPU for each iteration through the loop even though effects of the program instruction were observed in a previous iteration. Moreover, programs are emulated on a software implemented virtual CPU that consumes significant computational overhead. By contrast, the present invention executes program code on an actual or hardware based CPU 202. To ensure that malware is not executed, program code in the potential malware is translated into safe program code before being executed.

As illustrated in FIG. 2, the malware detection system 200 includes a scanner 204 designed to detect malware. As known to those skilled in the art and others, many different software vendors include a scanner in antivirus software that is configured to identify program code characteristic of malware. Unfortunately, existing scanners are not configured to work in conjunction with a system that translates potential malware into safe program code prior to execution. Instead, some existing scanners work in conjunction with the type of emulation system described above. In these systems, the scanner adds additional overhead so that the emulation process may take an unreasonable amount of time. However, the software routines implemented by the present invention provide the scanner 204 with the infrastructure needed to quickly identify obscured malware such as malware that is "unpacked" (i.e., decrypted) or otherwise loaded into memory at runtime.

The malware detection system 200 also includes a translation engine 206 designed to translate potential malware into architecture neutral program code. More specifically, the translation engine 206 may decode potential malware from a source language that is in any one of a number of different formats including, but not limited to, native CPU program code, platform independent byte code, and scripting program code. Then each instruction in the decoded program code is translated into an architectural-neutral format. During translation, the decoded program code may be partitioned into basic blocks. As known to those skilled in the art and others, basic blocks are sequences of program code that contain only a single entry point at the beginning of the sequence and a single exit point at the end of the sequence. Stated differently, a basic block contains, at most, a single "jump" instruction. The basic blocks of translated program code are the units that the potential malware is translated and executed by the present invention. Since program code may be translated from many source languages, the translation engine 206 supports plug-in modules such as plug-in module 218. A plug-in module provides the logic for translating program code in a source language into safe program code that is in the architecture-neutral format. In an alternative embodiment, the translation engine 206 translates potential malware directly from the source language into safe program code that may be executed. In this embodiment, the architecture-neutral format is not utilized. However, the architecture-neutral format simplifies implementation of the translation process in instances when the translation engine 206 is configured to translate program code from a plurality of source languages.

The malware detection system 200 also includes a block manager 208 for managing the execution of basic blocks. The block manager 208 is configured to analyze basic blocks and build data structures that store the information regarding the relationships between different basic blocks. After translated program code has been executed, logic contained in the block manager 208 provides the decision-making process for determining when to translate additional program code. In this regard, the block manager 208 will reference and update data stored in the data structure. Also, the block manager 208 contains logic for determining when program code should be searched for malware by the scanner 204.

As illustrated in FIG. 2, the malware detection system 200 includes a compilation engine 210 that generates program code that may be executed by the CPU 202. More specifically, the architecture-neutral program code generated by the translation engine 206 is compiled into an architecture-specific format by the compilation engine 210. Since program code may need to be compiled for many different architectures, the compilation engine 206 supports plug-in modules, such as plug-in module 220. A plug-in module provides the logic for compiling the architecture-neutral program code into program code that complies with the constraints imposed by a specific computer architecture.

As illustrated in FIG. 2, the malware detection system 200 also supports a virtual environment 212, which includes a virtual I/O system 214 and a virtual memory 216. Since many of the functions of the virtual environment are not important for an understanding of the present invention, they will not be described in detail here. Also, because they are not important for an understanding of the present invention, many of the components in the virtual environment 212 are not illustrated in FIG. 2. With respect to the present invention, the virtual environment 212 provides information regarding the use of resources by potential malware. For example, the block manager 208 provides the decision-making process for determining when to translate program code. In this regard, the block manager 208 may make a call to the virtual environment 212 to determine whether a basic block has been altered in memory during execution. The virtual environment 212 is configured to provide information regarding the use of resources, including changes in memory allocation, to the software routines implemented by the present invention.

As illustrated in FIG. 2, each component of the malware detection system 200, e.g., the central processing unit 202, the scanner 204, the translation engine 206, the block manager 208, the compilation engine 210, and the virtual environment 212 are interconnected and able to communicate with other components. As known to those skilled in the art and others, FIG. 2 is a simplified example of one malware detection system 200 capable of performing the functions implemented by the present invention. Actual embodiments of the malware detection system 200 will have additional components not illustrated in FIG. 2 or described in the accompanying text. Also, FIG. 2 shows one component architecture for safely executing translated program code, but other component architectures are possible.

Figure 3:
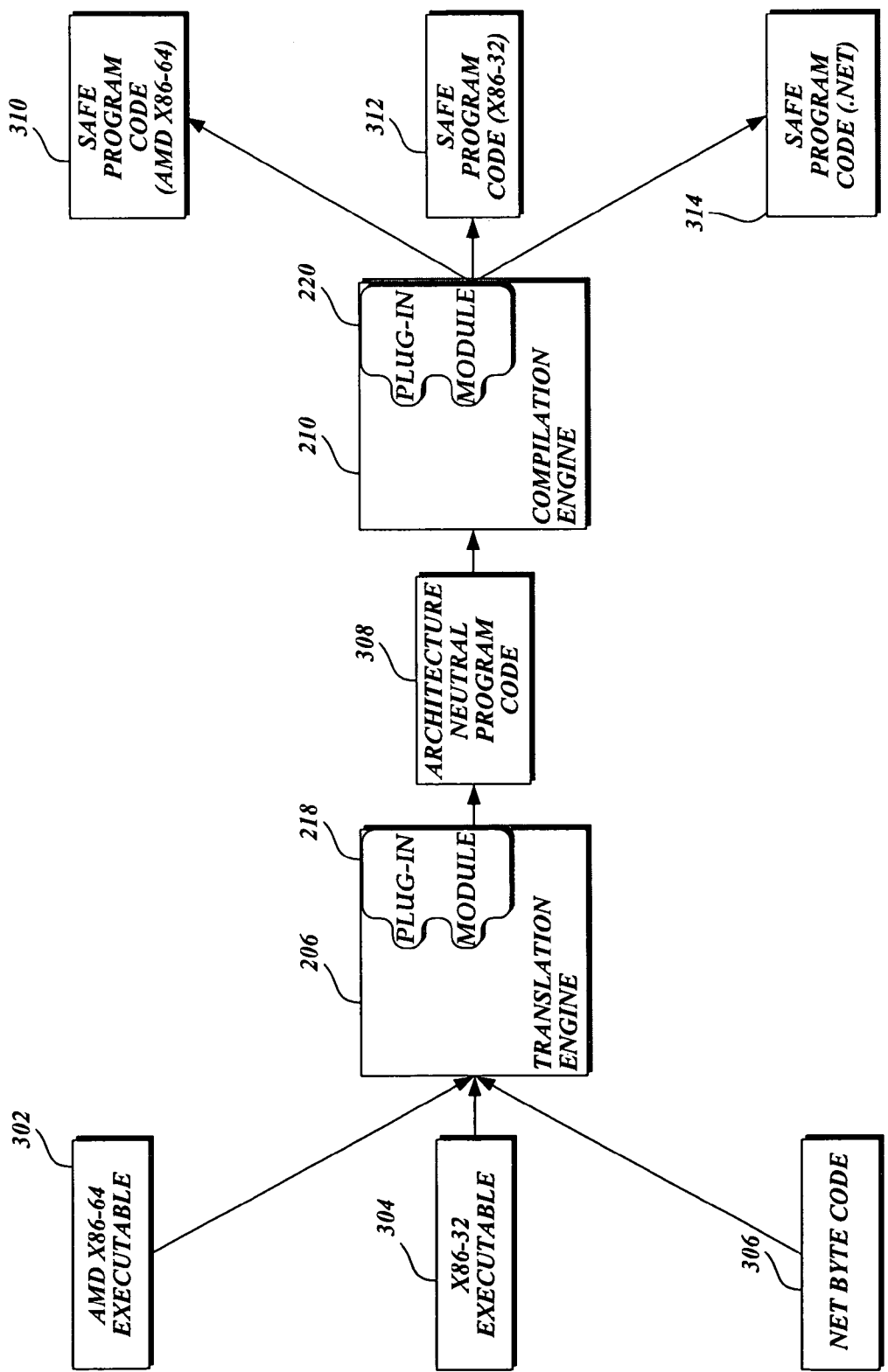
FIG. 3 is a block diagram that illustrates the process of translating potential malware into safe program code utilizing an architecture neutral format in accordance with the present invention.

Now, with reference to FIG. 3, components and routines implemented by the present invention to produce safe program code for purposes of malware detection will be described. FIG. 3 illustrates three examples of potential malware that include AMD-64 EXECUTABLE 302, X86-32 EXECUTABLE 304, and .NET BYTE CODE 306. Also shown in FIG. 3 are the translation engine 206, compilation engine 210, and plug-in modules 218-220 illustrated in FIG. 2. Generally described, the translation engine 206 and the compilation engine 210 work in conjunction to produce program code that is safe to execute. The embodiment of the present invention illustrated in FIG. 3 utilizes an architecture neutral format to produce safe program code. However, in alternative embodiments, the potential malware 302-306 may be directly translated into safe program code without utilizing the architecture neutral format.

Dynamic translation is typically defined as a procedure for converting program code from a source language to a target language or format. The program code is typically translated in order to satisfy an objective. For example, some existing translators optimize program code by reducing the set of instructions to a smaller but functionally equivalent set of instructions. By way of another example, some CPUs support translating program code from a language understood by an old computer architecture into a recently developed language so that legacy programs may be executed on a new computing device. Most modern translators are dynamic in that the procedures that convert the program code are performed at runtime or "on the fly" when the program code is being executed. Procedures that implement dynamic translation have been limited to areas other than malware detection. However, as illustrated in FIG. 3, the present invention provides a generalized framework in the translation engine 206 for translating program code from a source language (i.e., AMD 64 bits, X86 32 bits, and .NET byte code) to a target format (i.e., the architecture-neutral format) for purposes of malware detection. Stated differently, the translation engine 206 is not limited to translating program code only between two languages.

Instead, the translation engine 206 may be configured to support translation from a plurality of source languages. In this regard, plug-in modules may be added to the translation engine 206 to support translations between a source language and the architecture-neutral format. The types of source language illustrated in FIG. 3, should be construed as exemplary and not limiting. For example, the present invention may be configured to translate program code from a scripting language or an architecture-independent source language not shown in FIG. 3.

In an actual embodiment of the present invention, the plug-in module 218 supports translation between a language that satisfies the requirements of the "X86" 32-bit instruction set and the architecture-neutral format. During the translation process, not only is program code translated from the source language into functionally equivalent code in the target language, but the program code is also rendered "safe" (i.e., incapable of causing damage to a computing device if executed). For example, the following instruction may be implemented in a source language—"X/Y" wherein "X" and "Y" are numeric variables. This type of instruction could cause a program to crash if "Y" equals the value 0. In this instance, the instruction is translated into "X/Y as long as Y≠0." By way of another example, the plug-in module 218 translates instructions that attempt to access resources such as hardware devices, memory, and registers. As described above with reference to FIG. 2, the present invention is implemented in conjunction with a virtual environment 212 that maintains virtual resources. In this instance, the present invention translates instructions that access resources so that the necessary mapping between the virtual resources and actual resources is completed.

As illustrated in FIG. 3, after the potential malware 302-306 is translated into the architecture-neutral program code 308, the compilation engine 210 and the plug-in module 220 "compiles" the architecture-neutral program code 308 into safe program code. In FIG. 3, the safe program code is represented by SAFE PROGRAM CODE 310, SAFE PROGRAM CODE 312, and SAFE PROGRAM CODE 314. As shown, the safe program code may be in any one of a number of different formats depending on the architecture of the CPU 202 (FIG. 2). As known to those skilled in the art and others, compiling is traditionally defined as converting high-level program code into executable code. With regard to the present invention, the compilation engine 210 generates executable program code from the architecture-neutral program code 308. In one embodiment of the present invention, the architecture-neutral program code 308 is in a binary format. Thus, the "compilation" performed by the compilation engine 210 is defined as generating executable program code from architecture-neutral binary code. Also, the compilation engine 210 provides a generalized framework for "compiling" program code from the architecture-neutral format into executable code that satisfies the constraints of a specific computer architecture. Stated differently, the compilation engine 210 is not limited to "compiling" program code between two formats. Instead, the compilation engine 210 may compile the architecture-neutral program code 308 into program code that is in any one of a number of formats, depending on the architecture of the CPU 202. In this regard, the functionality provided by the compilation engine 210 may be extended by plug-in modules. In an actual embodiment of the present invention, the plug-in module 220 supports "compiling" architecture-neutral program code into program code that satisfies the constraints of the "X86" 32-bit instruction set.

Figure 1:
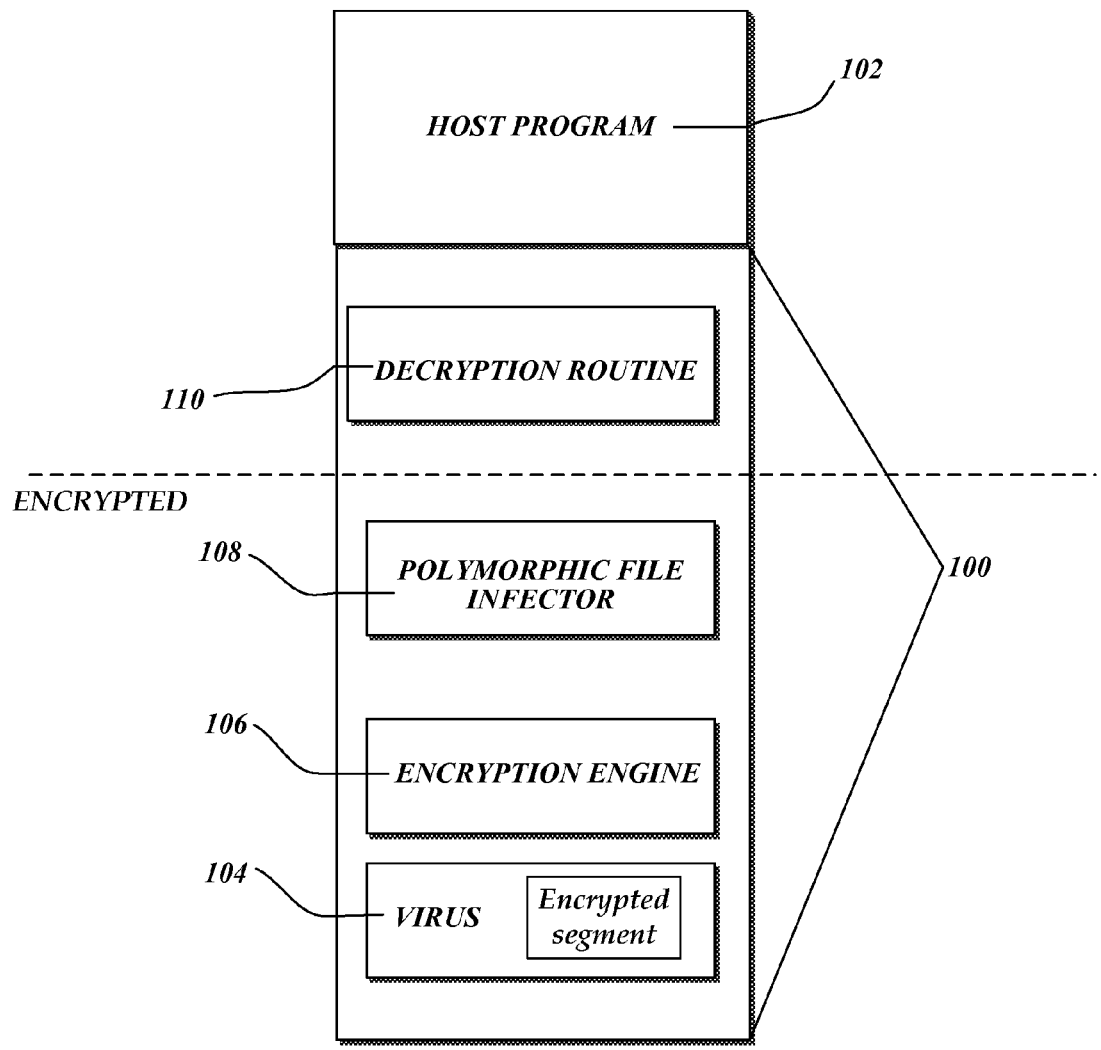
FIG. 1 is a block diagram illustrating the components of a polymorphic malware that the present invention may be used to identify.
Figure 4:
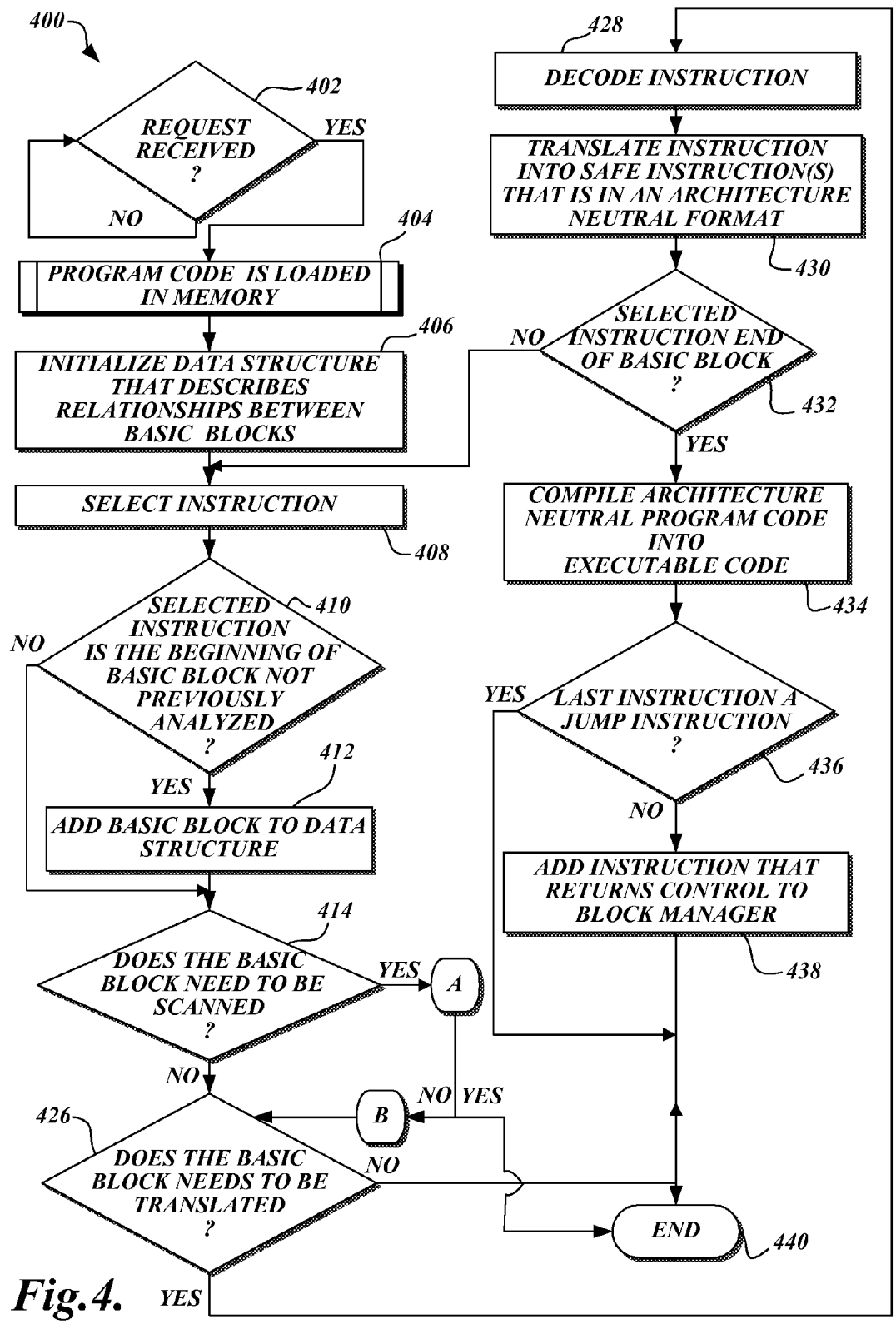
FIG. 4 is a flow diagram illustrating an exemplary embodiment of a translation method that may be used translate potential malware into safe program code in accordance with the present invention.
Figure 4:
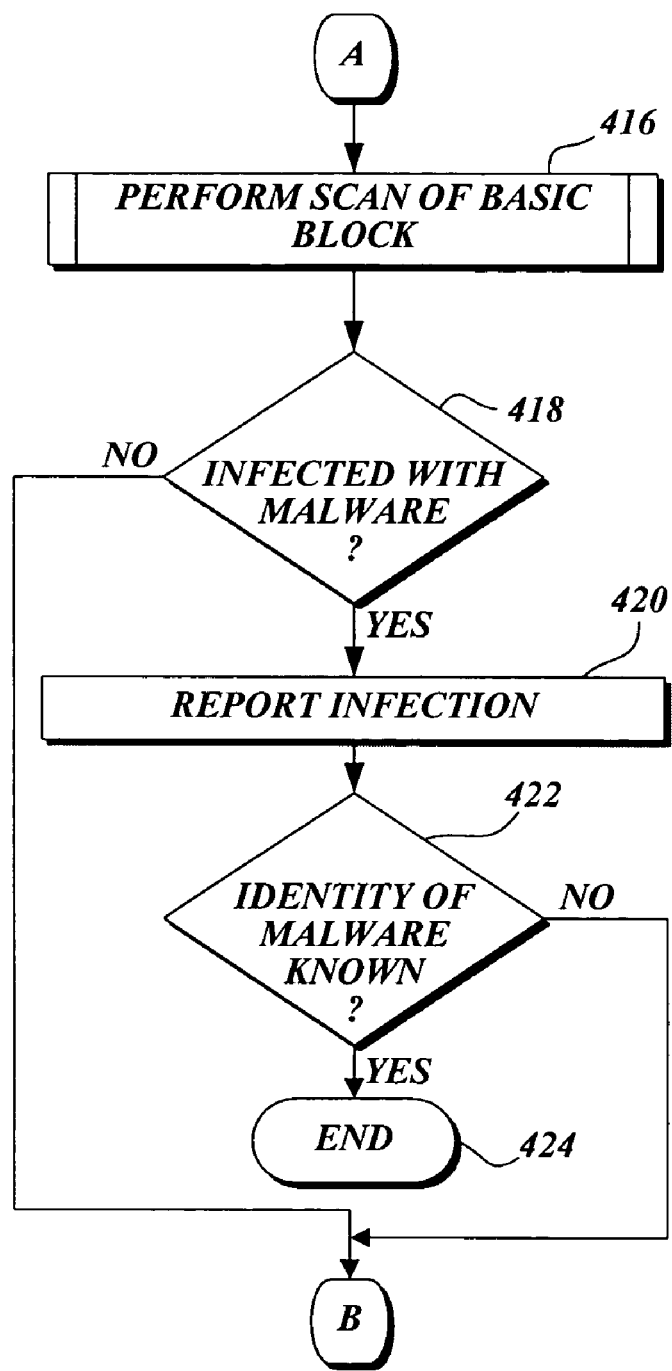

FIG. 4 is a flow diagram illustrating one exemplary embodiment of a translation method 400 formed in accordance with the present invention. In response to receiving a request to execute potential malware, the translation method 400 sequentially analyzes instructions in the potential malware. When an instruction in encountered that is the first instruction in a basic block that was not previously analyzed by the present invention, the translation method 400 causes a scanner to perform a search for malware in the basic block. The selected instruction is decoded into a set of data that describes attributes of the instruction. Then the set of data is used is used to translate the selected instruction into safe and functionally equivalent program code that is in an architecture-neutral format. After a basic block of program code is translated into the architectural-neutral format, the translated program code is "compiled" into executable code. With continuing reference to FIGS. 1-3 and the accompanying descriptions, an exemplary translation method 400 illustrated in FIG. 4 will now be described.

At step 402, the translation method 400 remains idle and waits for a request to execute potential malware. As will be appreciated by those skilled in the art and others, a request to execute potential malware may be initiated through a variety of different mechanisms. For example, a computer user may issue a request to start execution of a program by "double clicking" on an icon associated with the program. By way of another example, a computer user may initiate execution of a program associated with a file by issuing an "open file" command from a drop-down menu or other graphically based input system. However, as known to those skilled in the art and others, the examples provided above should be construed as exemplary and not limiting, as many different mechanisms exist for issuing a request to execute potential malware.

To satisfy the request received at step 402, an existing component of the operating system, at step 404, performs actions in preparation for executing the potential malware. Typically, to execute a program, an operating system initializes an address space (i.e., memory) for the program and copies required program code into the initialized address space. However, as known to those skilled in the art and others, malware may alter data in memory during execution by decrypting or otherwise "unpacking" a payload before a malware signature may be identified. Typically, the malware payload is "unpacked" as a result of the application of arithmetic and/or logic operations to data already stored in memory. In any event, program code associated with the potential malware is loaded in memory at step 404.

At step 406, the translation method 400 initializes a data structure that describes the properties of basic blocks in the potential malware, including the execution flow between basic blocks. As described in further detail below with reference to FIG. 5, the unit in which program code is typically executed by the present invention is a basic block. At step 406, a data structure is initialized with information that describes each basic block. For example, a basic block's successor basic blocks that are scheduled to execute subsequent to the current basic block are identified and stored in the data structure. Also, the type of control transfer that occurs between basic blocks (i.e., conditional and unconditional branches and the like) are identified and stored in the data structure. In this regard, instructions that accept control from other basic blocks or transfer control to another basic block are identified.

At step 408, the instruction that will be analyzed by the translation method 400 is selected. As described previously, instructions in a program are executed in a defined sequence. However, certain instructions, such as branches, interrupt the normal sequence of execution by placing a new value in a register used to identify the next instruction scheduled to be executed. As described in further detail below, instructions that interrupt the normal sequence of execution mark the end of a basic block. The analysis performed by the translation method 400 follows the same execution flow that occurs when a program is executed. However, the basic unit that program code is analyzed and thereafter executed is a basic block. Since, instructions that are in the flow of execution may be identified using techniques generally known in the art, further description of the technique used by the translation method at step 408 is not provided here As illustrated in FIG. 4, the translation method 400, at step 410, determines whether the instruction selected at step 408 is the first instruction in a basic block that was not previously analyzed by the present invention. In one embodiment of the present invention, instructions that are at the program entry point or at the destination address of a jump instruction are identified as the first instruction in a basic block. Also, the translation method 400 determines whether a basic block has been previously translated into safe program code by comparing the address of the selected instruction to the address of the first instruction in each basic block analyzed previously, if any. If the selected instruction does not match the address of the first instruction in a previously analyzed basic block, then the selected instruction is the beginning of a new basic block that was not previously translated into safe program code and the translation method 400 proceeds to step 412. Conversely, if the selected instruction is not the first instruction in a basic block or the current basic block has been analyzed previously, the translation method 400 proceeds to step 414.

At step 412, an entry for the basic block identified at step 410 is created in the data structure initialized at step 406. As described previously, a data structure maintained by the present invention describes the properties of basic blocks that are translated into safe program code. For example, the starting address of each basic block and other data that describes the attributes of basic blocks are stored in the data structure. Also, creating an entry in the data structure at step 412 includes instantiating certain variables associated with a basic block. For example, a variable indicative of whether a basic block has been scanned for malware (hereinafter referred to as a "scanned variable") and a variable indicative of whether a basic block was translated in to safe program code (hereinafter referred to as a "translated variable") are instantiated and stored in the data structure. When these variables are instantiated, at step 412, their values indicate that the basic block has not been scanned for malware or translated into safe program code.

At step 414, the translation method 400 determines whether the basic block that contains the selected instruction needs to be searched for malware before being executed. As described above, a "scanned" variable is associated with each basic block, which indicates whether the basic block was previously searched for malware. At step 414, the translation method 400 identifies the value of the variable associated with the current basic block. If the current basic block was not previously searched for malware, the translation method 400 proceeds to step 416. Conversely, if the basic block was previously searched, the translation method 400 proceeds to step 426 described below.

At step 416, the translation method 400 causes a scan to be performed of the basic block where the instruction selected at step 408 is located. In one embodiment of the present invention, software implemented routines in the scanner 204 (FIG. 2) search the current basic block for malware. As described above, most antivirus software applications or scanners search for malware by matching patterns of data to a malware "signature." However, a vulnerability to existing antivirus software occurs when data is "unpacked" (i.e., decrypted) or otherwise loaded in memory during execution, as happens with some obscured malware. In this instance, execution of program code in the potential malware continues without additional scans for malware being performed. Stated differently, execution is not interrupted when data is "unpacked" at runtime. However, as described in more detail below with reference to FIG. 5, the present invention does interrupt program execution when data is "unpacked" at runtime. Thus, at step 416, the scanner 204 may be searching for obscured malware after a malware payload has been "unpacked" or otherwise loaded into memory. Also, after the current basic block has been scanned, at step 416, the translation method 400 sets the value of the "scanned" variable associated with the current basic block to indicate that the current basic block was searched for malware.

As illustrated in FIG. 4, at step 418, the translation method 400 determines whether the current basic block was identified as being infected with malware at step 416. If a malware infection was identified, the method 400 proceeds to report the infection to the user at step 420 using techniques generally known in the art. If a malware infection was not identified, the translation method 400 proceeds to step 426 described below.

At step 422, the translation method 400 determines whether the identity of the malware was made with sufficient precision. When malware is detected, the identity of the malware is typically apparent from the signature or other characteristics of the malware. However, in some instances, a malware infection may be apparent without the exact identity of the malware being known. For example, some malware have variants that are difficult to distinguish. In any event, if a basic block is infected and the identity of the malware was made with sufficient precision, the translation method 400 proceeds to step 424 where it terminates. Conversely, if the identity of the malware was not made with sufficient precision, the translation method 400 proceeds to step 426.

At step 426, the translation method 400 determines whether the basic block that contains the selected instruction needs to be translated into safe program code before being executed. As described previously, the present invention associates a "translated" variable with each basic block that indicates whether the basic block was previously translated and "compiled" into safe and executable program code. If a basic block was not previously translated and "compiled" into executable and safe program code, the translated variable indicates that the basic block is potential malware. At step 426, the translation method 400 identifies the value of the translated variable for the current basic block. If the current basic block is potential malware, the translation method 400 proceeds to step 428. Conversely, if the basic block was previously translated and "compiled" in executable and safe program code, the translation method 400 proceeds to step 440, where it terminates. In this instance, the basic block may be safely executed in accordance with the execution method 500 described below with reference to FIG. 5.

As illustrated in FIG. 4, the translation method 400 decodes the selected instruction, at step 428, from the source language (i.e., native CPU program code, platform independent byte code, scripting program code, etc.) into a set of data that describes the instruction. The set of data includes, but is not limited to, the length and type of instruction, number and types of operands, and level of privilege required to execute the instruction. At step 428, the selected instruction is decoded from the source language into a set of data that describes the instruction so that the functionality provided by the selected instruction may be translated into the architecture-neutral format. Since, the selected instruction may be decoded using techniques generally known in the art, further description of the technique used by the present invention is not provided here.

At step 430, the selected instruction is translated into safe program code that is in an architecture-neutral format. The translation may be performed by a plug-in module to the translation engine 206, such as plug-in module 218 (FIG. 2). In general terms describing one exemplary embodiment of the present invention, the translation method 400 converts the selected instruction being analyzed into a safe instruction that is in an architecture-neutral format. To perform the translation, each type of instruction that may be used to "unpack" (i.e., decrypt) or otherwise cause malware functionality is translated into safe program code by a routine contained in a plug-in module to the translation engine 206. In this regard, instructions that implement arithmetic operations (i.e., "add," "multiply," etc.), bitwise operations (i.e., "and," "or," "xor," etc.), input/output with a hardware device (i.e., "read," "write," etc.) and the like are translated into functionally equivalent program code that is in the architecture-neutral format. For example, the present invention uses the resources in the virtual environment 212 (FIG. 2) which includes a virtual I/O system 214. Thus, if the selected instruction attempts to access an I/O device, the method 400 translates the instruction so that input and output is sent to the virtual I/O system 214. While specific examples of instructions that are translated by the present invention have been described, the examples provided should be construed as exemplary and not limiting.

As illustrated in FIG. 4, the translation method 400, at step 432, determines whether the instruction selected at step 408 is the last instruction in a basic block. Those skilled in the art and others recognize that basic blocks end with a single exit point such as a jump instruction. At step 432, the translation method 400 determines whether the instruction being analyzed is the last instruction in a basic block. Since, the last instruction in a basic block may be identified using techniques generally known in the art, further description of the technique used by the present invention is not described in further detail here. If the instruction being analyzed is the last instruction in the current basic block, the translation method 400 proceeds to step 432. Conversely, if the selected instruction is not the last instruction in a basic block, the translation method 400 proceeds back to step 408 and steps 408 through 432 repeat until the last instruction in the current basic block is selected.

As illustrated in FIG. 4, at step 434, the translation method 400 causes the current basic block to be "compiled" into executable program code. As known to those skilled in the art and others, a compiler is a program that obtains program code written in a source language and generates executable program code designed for a specific architecture. Typically, a compiler first parses all of the program code from the source language one after the other. Then in one or more successive stages, the compiler builds the executable program code, in such a way that ensures that instructions correctly reference other instructions. The output produced by a compiler satisfies the architecture requirements of a computing device and allows the CPU to sequentially execute instructions. With regard to the present invention, at step 434, the translation method 400 generates executable program code from the architecture-neutral program code. Since the architecture-neutral program code is in a binary format, the "compiling" that occurs at step 434 involves generating executable program code from architecture-neutral binary code. Also, as described in further detail below, during "compilation," one or more instructions may be added to the compiled code. In an actual embodiment of the present invention, the plug-in module 220 to the compilation engine 210 supports "compiling" architecture-neutral program code into program code that satisfies the constraints of the "X86" 32-bit instruction set. Then the translation method proceeds to step 436 where it terminates.

At step 436, the translation method 400 determines whether the last instruction in the "compiled" program code is a jump instruction. Typically, basic blocks end with a jump instruction that transfers control of execution to program code outside the current basic block. At step 430, the present invention translates jump instructions encountered into a new jump instruction that causes control of execution to be returned to the block manager 208 (FIG. 2) after the basic block is executed. Before basic blocks are executed, the block manager 208 performs certain actions described above including causing the scanner 204 to search for malware. However, basic blocks of program code may be split, merged, or otherwise manipulated by the present invention for purposes of malware detection. For example, as described in more detail below with reference to FIG. 5, when execution causes program code in memory to change in a basic block after the current execution point, continuing execution without scanning the basic block for malware may result in undesirable functionality. In this instance, a basic block is "split" into two or more basic blocks. As a result, in this and other instances, the translation method 400 will encounter basic blocks that do not end with a jump instruction. If the last instruction in the compiled program code is a jump instruction, then program control will return to the block manager 208 after the current basic block is executed. In this instance, the translation method 400 proceeds to block 440 where it terminates. Conversely, if the last instruction in the compiled program code is not a jump instruction, then control would not normally return to the block manager 208 after the current basic block is executed. In this instance, the translation method 400 proceeds to step 438.

At step 438, an instruction is added to the "compiled" program code that causes program control to be returned to the block manager 208 (FIG. 2) after execution of the basic block completes. The present invention manages aspects of the flow in program execution so that potential malware loaded in memory may be scanned and translated to safe program code before being executed. As described previously, the block manager 208 controls the flow of execution. Thus, an instruction is added to the compiled program code at step 438 that causes program control to be returned to the block manager 208 after execution of the basic block completes.

In an alternative embodiment of the present invention, an instruction is added to the "compiled" program code that does not transfer program control to the block manager 208. In this embodiment, if the next basic block scheduled to be executed is clean, e.g., was previously scanned for malware and was not altered as a result of execution, then an instruction is added at step 438 that transfers program control to the next basic block scheduled to be executed.

The steps in the translation method 400 described with reference to FIG. 4 may also be performed in a different order than shown. Also, some steps may be added or removed from the translation method 400 without departing from the scope of the present invention. For example, after a basic block of potential malware is translated in safe program code, the safe program code may be "optimized," i.e., reconfigured so that execution is fast. Thus, the method 400 depicted in FIG. 4 provides just one example of the manner in which an embodiment of the invention may be implemented.

Figure 5:
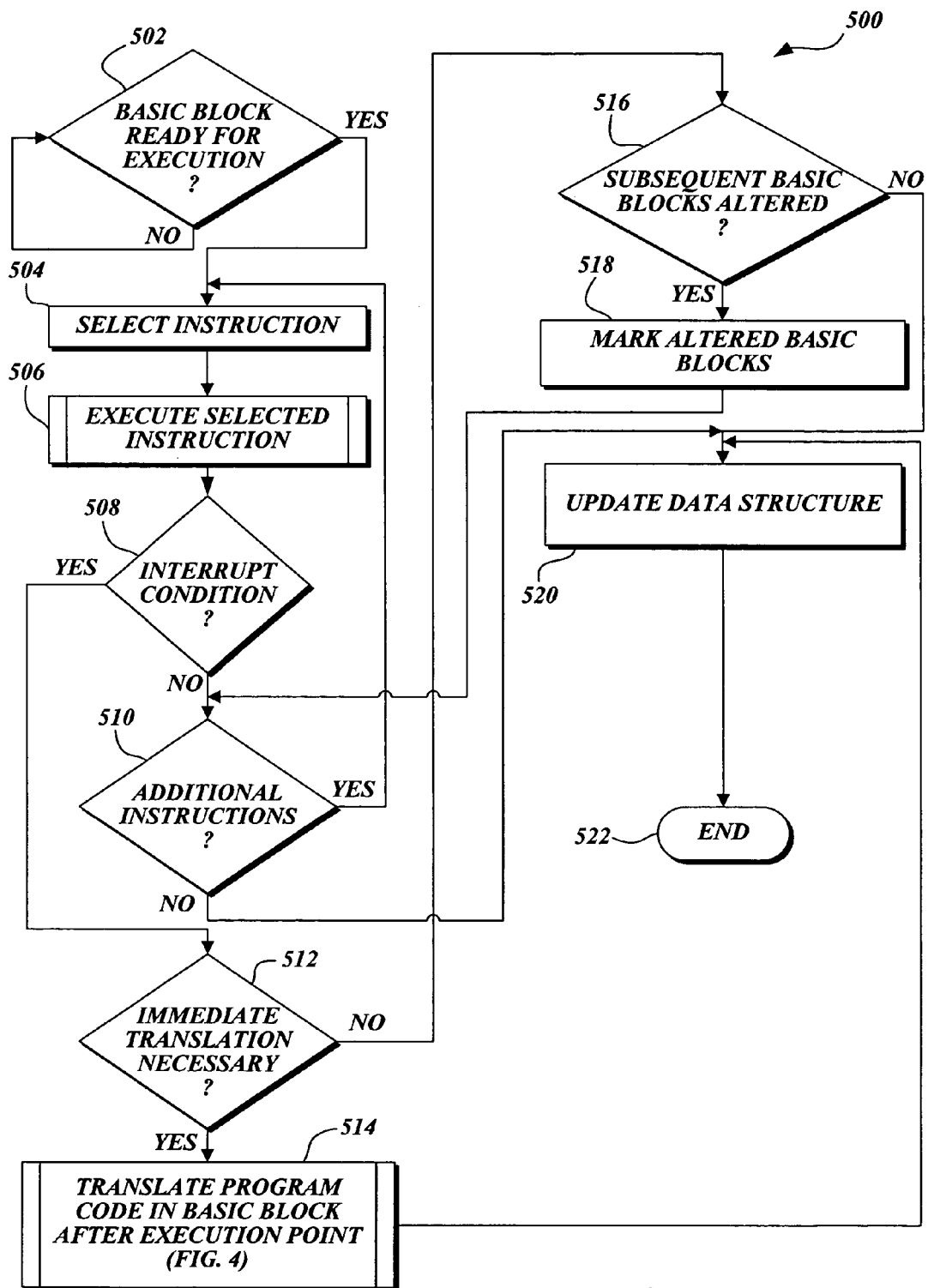
FIG. 5 is a flow diagram illustrating an exemplary embodiment of an execution method that may be used to execute program code in accordance with the present invention.

FIG. 5 is a flow diagram of one exemplary execution method 500 that may be used in conjunction with the translation method 400 described above with reference to FIG. 4 to execute basic blocks of translated program code. More specifically, instructions in a basic block are sequentially selected and executed on a hardware-based CPU. In some instances, program code in memory is "unpacked" (i.e., decrypted) and previously translated program code is altered. In this instance, the basic blocks that were altered are "dirty," e.g., need to be searched for malware and translated into safe program code before being executed. With continuing reference to FIGS. 1-4 and the accompanying descriptions, an exemplary execution method 500 illustrated in FIG. 5 will now be described.

At step 502, the execution method 500 remains idle and waits until translated program code is ready to be executed. In an actual embodiment of the present invention, translated program code is ready to be executed when the translation method 400 (FIG. 4) completes translating a basic block.

At step 504, the execution method 500 selects an instruction in the basic block scheduled to be executed. In one embodiment of the present invention, a basic block that was translated into safe program code is stored in a "buffer" or area of memory used for temporary storage. The memory addresses allocated to the "buffer" may not be altered by potential malware. For each instruction selected, the execution method 500 causes the instruction to be executed. Then a determination is made regarding whether execution caused an interrupt condition. In instances when the selected instruction caused an interrupt condition, the execution method 500 identifies the source of the interrupt condition. In some instances, the interrupt condition results from program code in memory being "unpacked" (i.e., decrypted). In this instance, basic blocks that were altered or overwritten are retranslated into safe program code before being executed.

At step 506, the execution method 500 causes the selected instruction to be executed. As known to those skilled in the art and others, the primary purpose of a CPU is to execute instructions. Thus, any one of a number of commercially available CPUs may be used to implement this aspect of the execution method 500. Typically, CPUs follow a "fetch and execute" cycle where instructions are sequentially "fetched" from memory and then "executed." With regard to the present invention, instructions are "fetched" from the buffer instead of the memory location that stores the potential malware. As described above, the buffer contains translated program code that may be safely executed without exposing a computing device to the effects of malware.

During execution, the method 500 determines whether the selected instruction attempted to perform an illegal or privileged operation. For example, the selected instruction may attempt to perform and arithmetic operation where a number is divided by zero or access a privileged memory location. In one embodiment of the present invention, the safe program code translated from the potential malware is configured so that the program code is able to detect error conditions that occur during execution and interrupt execution. If an error condition is identified during execution, then previously developed exception handlers will attempt to recover from the error condition. As known to those skilled in the art and others, exception handlers are event driven routines that use a structured method of handling interrupts. In some instances, an error condition is recoverable and program execution may resume after the interrupt condition is encountered. In other instances, the interrupt condition is critical and program execution stops before completion. However, before program control is transferred to an exception handler, information necessary to resume execution is stored in the event that an error condition is recoverable.

As illustrated in FIG. 5, at step 508, after the selected instruction is executed the execution method 500 determines whether an interrupt condition was caused as a result of execution. An interrupt condition may occur in different instances including but not limited to instances when execution causes (1) data after the execution point in the current basic block to be altered; and (2) data in a subsequent basic block that is scheduled to be executed to be altered. As described in more detail below, the execution method 500 handles these interrupt conditions differently. If an interrupt condition was detected at step 508 the execution method 500 proceeds to block 512 described below. Conversely, if an interrupt condition was not detected, at step 508, the execution method 500 proceeds to step 510.

At step 510, the execution method 500 determines whether all of the instructions in the current basic block have been executed. As described previously, the basic unit in which the present invention executes program code is a basic block. If all of the instructions in the current basic block have been executed, the execution method 500 proceeds to step 520 described below. Conversely, if any instruction in the current basic block has not been executed, the method 500 proceeds back to step 504 and steps 504 through 510 repeat until all of the instructions in the current basic block have been executed.

At step 512, the execution method 500 determines whether the interrupt condition identified at step 508 requires immediate translation of program code. For example, in instances when execution causes potential malware to be "unpacked" (i.e., decrypted) so that program code in the current basic block scheduled to be executed after the selected instruction is altered, then translation of the altered program code is performed before execution resumes. As described previously with regard to FIG. 4, basic blocks of program code may be split, merged, or otherwise manipulated by the present invention for purpose of malware detection. In instances when program code in the current basic block after the current execution point is altered, the current basic block is split into two basic blocks; the first containing the program code that was already executed and the second containing program code after the selected instruction. As described in further detail below, the second basic block is scanned for malware and translated into safe program code before being executed. If immediate translation of program code is not required, the execution method 500 proceeds to step 516 described below. Conversely, if immediate translation of program code is required, the execution method 500 proceeds to step 514.

At step 514, the execution method 500 causes a basic block to be scanned and translated into safe program code. More specifically, if step 514 is reached, a basic block has been split into two basic blocks based on the current execution point. The basic block that contains program code scheduled to be executed after the selected instruction is marked as needing to be scanned and translated into safe program code before being executed. One embodiment of a method for translating a basic block of program code into safe program code is described above with reference to FIG. 4. Then, the execution method 500 proceeds to step 520 described below.

At step 516, the execution method 500 determines whether the interrupt condition identified at step 508 was caused because program code in a subsequent basic block scheduled to be executed after the current basic block was altered as a result of execution. For example, in instances when executing the selected instruction causes program code to be "unpacked" (i.e., decrypted) so that data in a subsequent basic block is altered, then the subsequent basic blocks are searched for malware and translated into safe program code before being executed. If the interrupt condition identified at step 506 was caused because program code in a subsequent basic block was altered, the execution method 500 proceeds to step 518. Conversely, if the interrupt condition was caused for a different reason, the execution method 500 proceeds to step 520 described below.

At step 518, the execution method 500 marks the basic block(s) that were altered as a result of executing the selected instruction so that the basic blocks are searched for malware and translated into safe program code before being executed. As described with reference to FIG. 4 (at step 412), a scanned variable and translated variable are associated with each basic block. These variables indicates whether the basic block has been searched for malware or translated into safe program code. At step 518, the execution method 500 changes the value of the variables associated with each basic block that were altered as a result of execution to indicate the basic block(s) needs to be scanned for malware and translated into safe program code before being executed.

At step 520, the execution method 500 causes the data structure initialized at step 406 (FIG. 4) to be updated. As described previously, the present invention uses a data structure to track the flow of execution between basic blocks. In implementing this aspect of the present invention, the block manager 208 (FIG. 2) obtains control of execution and performs updates to the data structure. Those skilled in the art and others will recognize that executing a basic block using the execution method 500 may cause the original flow of execution to change. For example, executing a basic block may cause data loaded in memory to be altered by previously decrypted data. Obviously, in this situation, the original flow of execution between basic blocks is changed. As a result, the execution method 500 updates the data structure to reflect the changes that occurred as a result of execution. Typically, the next basic block scheduled to be executed will then be translated into safe program code and executed in accordance with the translation method 400 and execution method 500. Then the execution method 500 proceeds to step 522 where it terminates.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for generating safe program code in response to receiving a request to execute potential malware, the method comprising:
    loading an executable into memory to be executed by a hardware processor of a computer system;
    dividing the executable into blocks of instructions, wherein a block of instructions has a single entry point and a single exit point, the blocks of instructions including a first block and a second block, wherein the instructions of the first and second block each perform a functionality, wherein properties of the blocks are maintained in a data structure, the properties include an indication whether the instructions of a particular block have been translated into safe instructions;
    prior to executing the first block, translating the instructions of the first block into safe instructions that perform the same functionality as the instructions of the first block, and updating the properties of the first block in the data structure to indicate that the instructions of the first block have been translated to safe instructions;
    executing the safe instructions of the first block on the hardware processor;
    prior to executing the second block, translating the instructions of the second block into safe instructions that perform the same functionality as the instructions of the second block, and updating the properties of the second block in the data structure to indicate that the instructions of the second block have been translated to safe instructions;
    commencing to execute the safe instructions of the second block on the hardware processor;
    during the execution of the safe instructions of the second block, detecting that the safe instructions of the second block modify the instructions of the first block; and
    updating the properties of the first block to indicate that the instructions of the first block have not be translated such that upon attempting to execute the safe instructions of the first block, the modified instructions of the first block will be translated into new safe instructions prior to executing the first block.

2. The method of claim 1, wherein the safe instructions of the first and second blocks are stored in a separate location in memory from the executable.

3. The method of claim 1, wherein detecting that the safe instructions of the second block modify the instructions of the first block comprises processing an interrupt.

4. The method of claim 1, wherein the data structure further includes an indication of whether a particular block has been scanned for malware, the method further comprising:
    prior to executing the first or second blocks, determining whether the block to be executed has been scanned for malware by accessing the properties of the data structure, such that if the properties indicate that the block to be executed has not been scanned, the block is scanned prior to execution and the properties are updated accordingly.

5. The method of claim 1, wherein the data structure further includes an indication of the flow of execution between blocks.

6. The method of claim 1, wherein safe instructions are generated by:
    generating a set of instructions in an architecture-neutral format that are incapable of implementing malware functionality, the set of instructions providing the same functionality as the instructions from the block; and
    compiling the set of instructions composed in the architecture-neutral format into program code that is executable on at least one computing device.

7. The method of claim 1, wherein safe instructions include functionality to perform the following:
    detect errors that occur during execution;
    interrupt execution and call an exception handler; and
    store information necessary to resume execution after the exception handler completes execution.

8. A computer-implemented method for generating safe program code in response to receiving a request to execute potential malware, the method comprising:
    loading an executable into memory to be executed by a hardware processor of a computer system;
    dividing the executable into blocks of instructions, wherein a block of instructions has a single entry point and a single exit point, the blocks of instructions including a first block, wherein the instructions of the first block perform a functionality, wherein properties of the blocks are maintained in a data structure, the properties include an indication whether the instructions of a particular block have been translated into safe instructions;

prior to executing the first block, translating the instructions of the first block into safe instructions that perform the same functionality as the instructions of the first block, and updating the properties of the first block in the data structure to indicate that the instructions of the first block have been translated to safe instructions;

executing the safe instructions of the first block on the hardware processor;

during the execution of the safe instructions of the first block, detecting that a safe instruction of the first block modifies one or more instructions of the first block that are after the current execution point;

splitting the first block into two blocks, the first split block containing the safe instructions that had already been executed prior to the modification of the one or more instructions, the second split block containing the instructions of the first block after the current execution point including the modified one or more instructions; and translating the instructions of the second split block into new safe instructions prior to executing the second split block.

9. The method of claim 8, wherein the safe instructions are stored in a separate location in memory from the executable.

10. The method of claim 8, wherein detecting that a safe instruction of the first block modifies one or more instructions of the first block that are after the current execution point comprises processing an interrupt.

11. The method of claim 8, wherein the data structure further includes an indication of whether a particular block has been scanned for malware, the method further comprising:

prior to executing the first, determining whether the first block has been scanned for malware by accessing the properties of the data structure, such that if the properties indicate that the first block has not been scanned, the first block is scanned prior to execution and the properties are updated accordingly.

12. The method of claim 8, wherein the data structure further includes an indication of the flow of execution between blocks.

13. The method of claim 8, wherein safe instructions are generated by:

generating a set of instructions in an architecture-neutral format that are incapable of implementing malware functionality, the set of instructions providing the same functionality as the instructions from the block; and compiling the set of instructions composed in the architecture-neutral format into program code that is executable on at least one computing device.

14. The method of claim 8, wherein safe instructions include functionality to perform the following:

detect errors that occur during execution;

interrupt execution and call an exception handler; and store information necessary to resume execution after the exception handler completes execution.

15. A computer storage medium storing computer executable instructions which when executed by a processor of a computer system generate safe program code in response to receiving a request to execute potential malware by performing the following:

loading an executable into memory to be executed by a hardware processor of the computer system;

dividing the executable into blocks of instructions, wherein a block of instructions has a single entry point and a single exit point, the blocks of instructions including a first block and a second block, wherein the instructions of the first and second block each perform a functionality, wherein properties of the blocks are maintained in a data structure, the properties include an indication whether the instructions of a particular block have been translated into safe instructions;

prior to executing the first block, translating the instructions of the first block into safe instructions that perform the same functionality as the instructions of the first block, and updating the properties of the first block in the data structure to indicate that the instructions of the first block have been translated to safe instructions;

executing the safe instructions of the first block on the hardware processor;

prior to executing the second block, translating the instructions of the second block into safe instructions that perform the same functionality as the instructions of the second block, and updating the properties of the second block in the data structure to indicate that the instructions of the second block have been translated to safe instructions;

commencing to execute the safe instructions of the second block on the hardware processor;

during the execution of the safe instructions of the second block, detecting that the safe instructions of the second block modify the instructions of the first block; and updating the properties of the first block to indicate that the instructions of the first block have not be translated such that upon attempting to execute the safe instructions of the first block, the modified instructions of the first block will be translated into new safe instructions prior to executing the first block.

16. The computer storage medium of claim 15, wherein the safe instructions of the first and second blocks are stored in a separate location in memory from the executable.

17. The computer storage medium of claim 15, wherein detecting that the safe instructions of the second block modify the instructions of the first block comprises processing an interrupt.

18. The computer storage medium of claim 15, wherein the data structure further includes an indication of whether a particular block has been scanned for malware, the method further comprising:

prior to executing the first or second blocks, determining whether the block to be executed has been scanned for malware by accessing the properties of the data structure, such that if the properties indicate that the block to be executed has not been scanned, the block is scanned prior to execution and the properties are updated accordingly.

19. The computer storage medium of claim 15, wherein the data structure further includes an indication of the flow of execution between blocks.

20. The computer storage medium of claim 15, wherein safe instructions are generated by:

generating a set of instructions in an architecture-neutral format that are incapable of implementing malware functionality, the set of instructions providing the same functionality as the instructions from the block; and compiling the set of instructions composed in the architecture-neutral format into program code that is executable on at least one computing device.

21. The computer storage medium of claim 15, wherein safe instructions include functionality to perform the following:

detect errors that occur during execution;

interrupt execution and call an exception handler; and store information necessary to resume execution after the exception handler completes execution.

22. The computer storage medium of claim 15, further comprising:

during the execution of the safe instructions of the first block, detecting that a safe instruction of the first block modifies one or more instructions of the first block that are after the current execution point;

splitting the first block into two blocks, the first split block containing the safe instructions that had already been executed prior to the modification of the one or more instructions, the second split block containing the instructions of the first block after the current execution point including the modified one or more instructions; and translating the instructions of the second split block into new safe instructions prior to executing the second split block.

* * * * *